No. 753,885. PATENTED MAR. 8, 1904.
F. C. HOWELL.
FRUIT PICKER.
APPLICATION FILED OCT. 24, 1903.
NO MODEL.
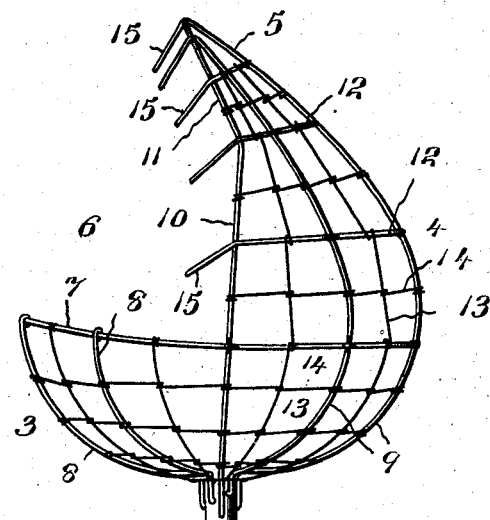
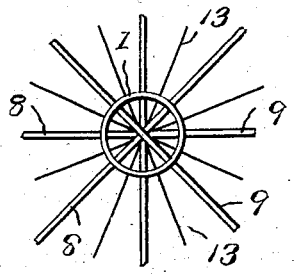
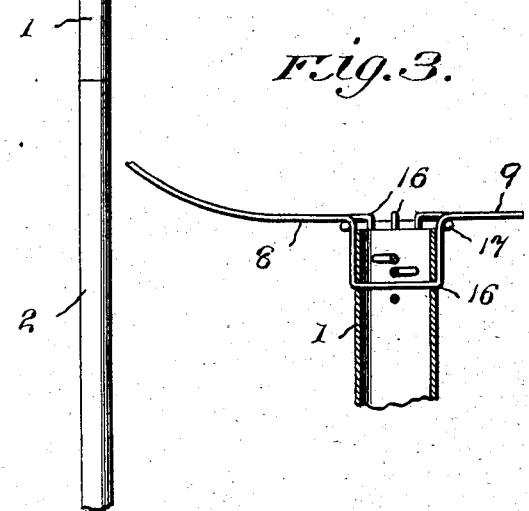
Witnesses
Inventor
Frank C. Howell.
By Victor J. Evans
Attorney No. 753,885.

Patented March 8, 1904.

UNITED STATES PATENT OFFICE.

FRANK C. HOWELL, OF BRIDGEHAMPTON, NEW YORK.

FRUIT-PICKER.

SPECIFICATION forming part of Letters Patent No. 753,885, dated March 8, 1904.

Application filed October 24, 1903. Serial No. 178,347. (No model.)

*To all whom it may concern:*

Be it known that I, FRANK C. HOWELL, a citizen of the United States, residing at Bridgehampton, in the county of Suffolk and State of New York, have invented new and useful Improvements in Fruit-Pickers, of which the following is a specification.

This invention relates to fruit-pickers; and the object of the same is to provide a simple and effective device of this class which will enable the user to handle it with facility, to introduce it among the branches of a tree to take or gather any particular apple, peach, pear, or other fruit and arrange the parts in such manner that the fruit when pulled from a branch or limb will fall but a short distance, and thus avoid bruising.

The improved device includes in its organization on open-work or wire basket having an upwardly-projecting hood, also of open-work, and terminating at its upper edge in depending hook or grab devices, which are spaced apart from each other and coöperate with the adjacent part of a hood to facilitate the separation of the fruit from a branch or limb, the open-work of the entire picker preventing the congregation of dirt or other matter therein and also giving the user or operator full view of the contents of the picker to determine when the latter is sufficiently full.

The invention also consists in the details of construction and arrangement of the several parts, which will be more fully hereinafter described and claimed.

In the drawings, Figure 1 is a side elevation of a fruit-picker embodying the features of the invention and showing the handle partially broken away. Fig. 2 is a bottom plan view of a portion of the picker, illustrating the mode of tying the frame-wires. Fig. 3 is a transverse vertical section through a portion of the upper extremity of the handle-socket and the lower part of the picker, illustrating how the frame-wires are secured in the said socket.

Similar numerals of reference are employed to indicate corresponding parts in the several views.

The numeral 1 designates a handle-socket of suitable thickness, preferably constructed of metal and adapted to receive a handle 2 of any length. Secured to the upper extremity of the socket 1 is a basket 3, having a hood 4 rising therefrom mainly at one side of the center and provided with an upper deflected extremity 5, the hood 4 being disposed opposite an inlet-opening 6. The basket 3 comprises an upper surrounding stiff frame-wire 7, to which are attached downwardly and inwardly curved frame-wires 8, which converge toward the upper extremity of the socket 1. Other frame-wires 9 are attached to the marginal frame-wire 7 of the basket and likewise curved downwardly and converged toward the upper extremity of the said socket. The wires 9 continue in converging curved lines above the marginal wire 7 to the upper portion of a supporting-loop 10, having its lower extremities also attached to the frame-wire 7 and its terminals secured in the socket 1. The upper bow 11 of the loop 10 is deflected at an angle over the open portion of the basket below to render the gathering operation of the picker effective. Extending transversely around and connected to the wires 9 and the loop 10 are frame-wires 12. Connected to the several frame-wires of the basket and hood and disposed at intersecting planes at right angles are mesh-wires 13 and 14 of materially smaller gage than the said frame-wires. This arrangement of frame and mesh wires provides a fruit-picker of openwork construction which will permit the contents to be readily seen to ascertain when the picker becomes filled with fruit and also to prevent the congregation therein of small twigs or other deposits. The wire 9 between the loop 10 and the next similar wire 9 is duplicated on the opposite side of the hood, and the upper extremities of the said wires 9 and the terminals of the wires 12 are continued over the loop 10 and deflection 11 of the latter and struck inwardly at an angle of inclination to produce gathering fingers or hooks 15, which are regularly spaced apart from each other.

To give rigidity to the several frame-wires running down to the upper extremity of the socket 1, said wires are looped, as at 16, and passed through openings at different elevations in the socket, as clearly illustrated by Fig. 3, and to hold the wires in close relation to the upper end of the socket a circular binding wire or ring 17 is placed therearound, and over said binding wire or ring the mesh-wires are alternately interlaced, as clearly shown by Fig. 2. By thus securing the basket and its hood to the socket 1 the use of soldering or other analogous material is avoided and a stronger joint results. It is also proposed to make the basket and its hood in various sizes, and the frame-wires, as well as the mesh-wires, may be treated to render the same non-corrosive.

In the operation of the device the user pushes the basket and hood up to or through the branches of a fruit-tree and engages the upper portion of the fruit in such manner that two of the gathering fingers or hooks 15 will bear against the upper portion of the fruit. By exerting a downward pull on the fruit it will be obvious that the same may be easily separated and fall into the basket 3. The hood increases the capacity of the basket and at the same time, through the medium of the loop 10, forming part thereof, provides simple means for disposing the gathering fingers or hooks, as set forth. Moreover, the hood will prevent the fruit from being thrown out of engagement with the picker, particularly in the operation of separating the fruit. As soon as the picker becomes filled it is lowered and may be readily emptied without requiring manual assistance on the part of the operator.

Having thus fully described the invention, what is claimed as new is—

1. A fruit-picker having a lower curved basket closed at the bottom, the said basket being formed of wire and having some of its members projected upwardly and forwardly thereover to form a hood, the upper terminal of the hood being angularly deflected and said hood having cross members which are projected beyond its margin and bent inwardly, the basket opposite the hood being fully open, and a handle secured to the central part of the closed bottom of the basket.

2. A fruit-picker, having a basket formed of wire and its upper portion open at one side of the center, a hood projecting above the remaining portion and partially overhanging the open portion, the hood being likewise formed of wire and portions thereof constructed by extending a part of the wires of the basket, the terminals of a portion of the wires of the hood projecting over the open part of the basket and bent inwardly at an angle of inclination, a part of the basket being closed, a handle-socket at the center of the closed bottom of the basket to which the wires are connected, and a handle fitted in the said socket.

In testimony whereof I affix my signature in presence of two witnesses.

FRANK C. HOWELL.

Witnesses:
G. F. HALLOCK,
EDWIN J. HIEDUTT.